United States Patent [19]
Niles et al.

[11] Patent Number: 5,551,568
[45] Date of Patent: Sep. 3, 1996

[54] STACKING DEVICE FOR CONTAINERS

[75] Inventors: Gerald J. Niles; Davis W. Chamberlin, both of St. Paul, Minn.

[73] Assignee: Minnesota Mining and Manufacturing Company, St. Paul, Minn.

[21] Appl. No.: 467,734

[22] Filed: Jun. 6, 1995

Related U.S. Application Data

[60] Division of Ser. No. 52,121, Apr. 22, 1993, which is a continuation-in-part of Ser. No. 915,126, Jul. 17, 1992, Pat. No. 5,303,823.

[51] Int. Cl.⁶ .............................. B65D 21/02; B65D 6/18
[52] U.S. Cl. ...................... 206/509; 270/4.26; 270/4.29; 270/7
[58] Field of Search .................................. 206/503, 509, 206/511, 821; 220/4.76, 4.27, 4.28, 4.29, 6, 7

[56] References Cited

U.S. PATENT DOCUMENTS

| | | |
|---|---|---|
| 1,654,225 | 12/1927 | Tanner . |
| 2,226,670 | 12/1940 | Pratt et al. .................. 206/511 X |
| 3,371,816 | 3/1968 | Ricci ............................... 220/4.28 |
| 3,374,915 | 3/1968 | Verhein et al. ................ 206/511 X |
| 3,497,127 | 2/1970 | Box . |
| 3,675,808 | 7/1972 | Brink .................................... 220/7 |
| 3,902,599 | 9/1975 | Stromberg ........................ 206/511 |
| 3,950,603 | 4/1976 | Brefka . |
| 4,002,287 | 1/1977 | Saveth . |
| 4,124,173 | 11/1978 | Damour . |
| 4,182,072 | 1/1980 | Much . |
| 4,516,786 | 5/1985 | Lund . |
| 4,662,515 | 5/1987 | Newby, Sr. . |
| 4,708,246 | 11/1987 | Minion . |
| 4,726,091 | 2/1988 | Joyce . |
| 4,730,779 | 3/1988 | Thievessen . |
| 4,765,500 | 8/1988 | Ingram . |
| 4,782,972 | 11/1988 | Wenkman et al. ............... 220/4.28 |
| 4,883,178 | 11/1989 | Thiele et al. . |
| 4,955,471 | 9/1990 | Hirose et al. . |
| 4,998,637 | 3/1991 | Marovskis . |
| 5,054,643 | 10/1991 | Joyce . |
| 5,086,919 | 2/1992 | Toral et al. . |
| 5,094,346 | 3/1992 | Sommerfeldt et al. . |
| 5,094,356 | 3/1992 | Miller ..................................... 220/7 |
| 5,271,515 | 12/1993 | Berkheimer et al. ........... 220/4.27 |

FOREIGN PATENT DOCUMENTS

| | | |
|---|---|---|
| 2255674 | 7/1975 | France . |
| 2315453 | 1/1977 | France . |
| 1765059A1 | 9/1992 | U.S.S.R. . |
| 1270715 | 4/1972 | United Kingdom . |

*Primary Examiner*—Bryon P. Gehman
*Attorney, Agent, or Firm*—Gary L. Griswold; Walter N. Kirn; Charles D. Levine

[57] ABSTRACT

A parallelepipedal storage container is formed of at least two-sections. Each section is foldable to separate the section into a central base wall and two side walls. The adjacent base and side walls can be oriented at right angles to each other. The storage container is formed by mating the sections so that the side edges of the side walls on one section are disposed adjacent the side edges of the side walls of the other section to form edges of the storage container. The sections are secured together using a tongue and groove connection to mate the sections along respective edges. Three and four section containers can be formed.

9 Claims, 9 Drawing Sheets

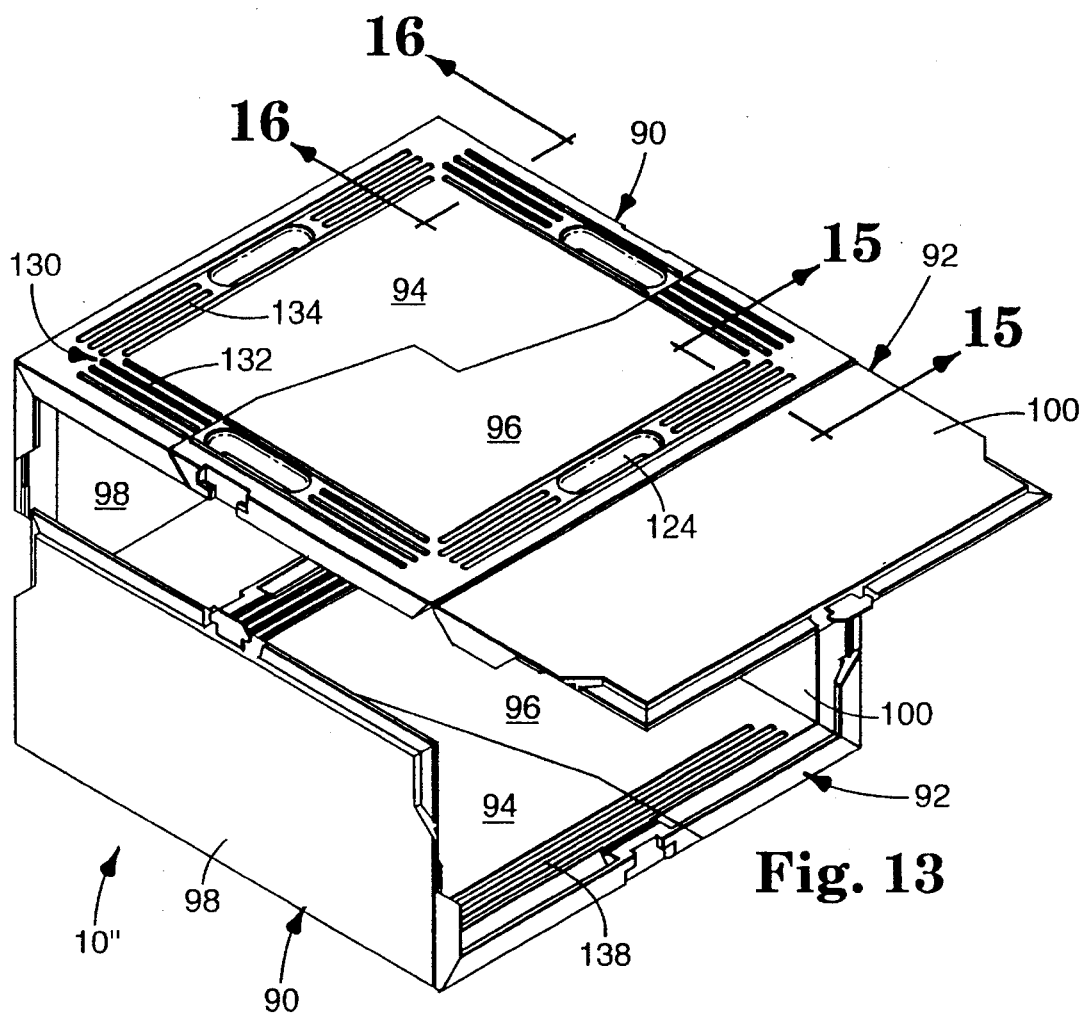
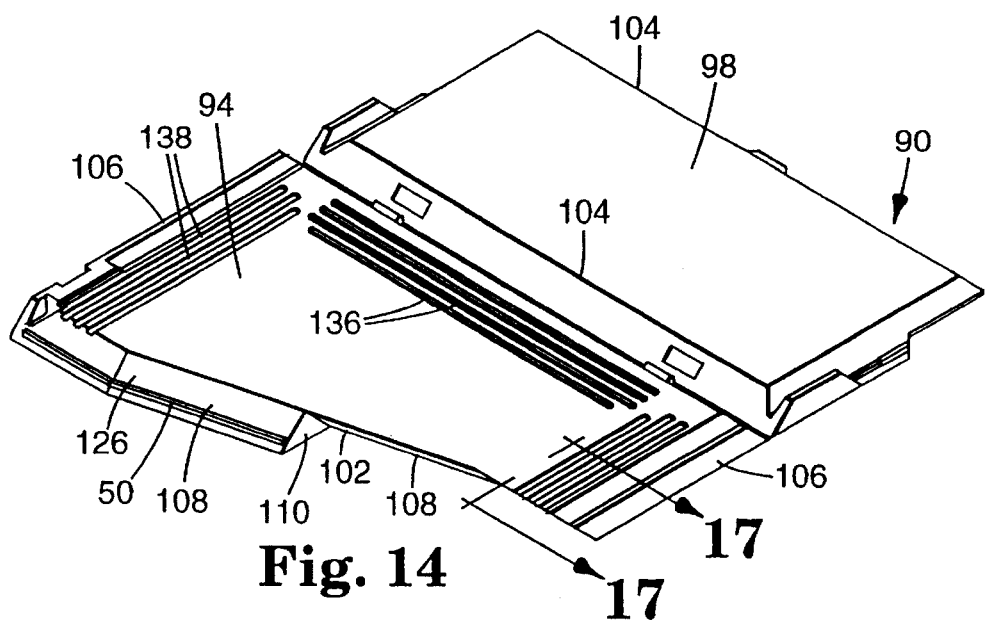

STACKING DEVICE FOR CONTAINERS

This is a Division Application of U.S. application Ser. No. 08/052,121, filed Apr. 22, 1993; which is a Continuation-In-Part Application of U.S. application Ser. No. 07/915,126, filed Jul. 17, 1992, issued as U.S. Pat. No. 5,303,823.

TECHNICAL FIELD

The present invention relates to storage and shipping containers. More particularly, the present invention relates to recyclable and reusable storage and shipping containers having a simple construction.

BACKGROUND OF THE INVENTION

In producing magnetic recording media, there is a recurring need to transport large quantities of recording tape from the point of tape manufacture to other locations for final loading into cassettes, cartridges, or other carriers. It is common to transport the tape in the form of relatively large rolls, called pancakes. A pancake of 1.27 cm (0.5 in) wide tape is typically wound on a hollow annular core having an outer diameter of 11.4 cm (4.5 in), and a width of 1.8 cm (0.7 in), slightly larger than the width of the tape. The outer diameter of the pancakes is typically about 35.6–40.7 cm (14–16 in). Shipping these tape pancakes over long distances under conditions of mechanical shock and vibration requires that they be well supported.

One primary form of damage to pancakes is axial shifting of the layers of tape relative to the pancake such that the pancake is no longer flat. This shifting, called core drop, hub drop, popped strands, or tape shift, can be caused by a stack of pancakes being dropped on a hard floor or being transported over rough or bumpy surfaces. Other problems and damage caused with known pancake containers include the offsetting of a portion of the pancake, called "upset," rotation of the core relative to the pancake, and transfer of cushion adhesive to the tape.

While effective protection of the tape in the pancake stacks is essential, the magnetic tape market is very price-competitive. Thus, protective packaging must be low cost, both in the packaging material itself, and in the labor required to apply and remove the packaging. It is also desirable to minimize the amount of packaging waste material which is discarded.

Known methods of protecting pancakes during shipping generally involve sliding several pancakes over a shaft or hollow tube, placing resilient spacers between each pancake, and placing a solid end plate on the top and bottom of the stack. The stack can be held together by shrink wrap film, as disclosed in U.S. Pat. No. 4,955,471. However, the application and removal of shrink wrap film is very labor-intensive. Removal can involve cutting or other operations which can damage the pancake and generate waste which can contaminate the tape. Also, shrink wrap is not reusable, thereby increasing costs and waste.

The shrink wrap removal problem is addressed in U.S. Pat. No. 4,708,246, assigned to Minnesota Mining and Manufacturing Company. This patent discloses grooves in the outer surface of the package to allow a knife to cut the shrink wrap without contacting the inner packaging material. This is accomplished by running the knife along the groove, without penetrating beyond the depth of the groove as the shrink wrap is cut.

U.S. Pat. No. 4,883,178 eliminates shrink wrap. This patent discloses holding the stack together with a threaded member running coaxially along the center of the stack, and a nut which tightens on an end plate. The compression is created by the threaded member being disposed within the pancake cores. This method is less labor intensive than shrink wrap, but it does not enclose the stack, so that additional wrapping may still be required.

U.S. Pat. No. 4,708,246 discloses spacers and other packaging features which improve compression control. However, sometimes spacers move during shipping and can generate debris. Also, some spacer materials can create static which attracts debris to the pancakes.

Radially expanding mandrels are also known. U.S. Pat. No. 4,124,173 discloses an inflatable tube inside of an expandable mandrel. Cam mechanisms which press cylinder segments outwardly when a central shaft rotates relative to the outer segments are also known. U.S. Pat. No. 4,516,786 discloses a rotatable core chuck and U.S. Pat. No. 4,730,779 discloses an expanding assembly for a web-coiling core.

U.S. Pat. No. 5,094,346 assigned to Minnesota Mining and Manufacturing Company stacks pancakes on a mandrel within a container. The container includes a base, at least one mandrel extending from the base on which pancakes can be placed, and a cover which encloses the pancakes. The cover has an internal space shaped to approximate the shape and size of a plurality of pancakes. The mandrel could radially expand to secure the pancakes and/or the pancakes could be secured by axial pressure.

U.S. Pat. No. 4,002,287 discloses a container blank and a container for shipping items such as cakes. The container is formed of two sections. Each section is rectangular and is foldable to separate the section into three sectors. The adjacent sectors can be oriented at right angles to each other to form a U. The storage container is formed by folding one section into a U, folding the other section into an upside down U, and mating the two sections so that the side edges of the wing sectors of the U on one section are disposed adjacent the side edges of the wing sectors of the other U to form the storage container edges. The two sections are secured together by hooks.

Living hinges which snap into an open or closed configuration for use with containers are disclosed in U.S. Pat. Nos. 5,054,643 and 4,726,091.

SUMMARY OF THE INVENTION

A parallelepipedal storage container is formed of two substantially identical sections. Each section is foldable to separate the section into a central base wall and two side walls. The adjacent base and side walls can be oriented at right angles to each other. The storage container is formed by folding one section, folding the other section, and mating the two sections so that the side edges of the side walls of one section are disposed adjacent the side edges of the side walls of the adjacent section to form edges of the storage container. The two sections are secured together to form the container.

The two sections are secured together. Each edge of each side wall has a first edge guide extending along a part of the length of the edge adjacent the base wall at a substantially right angle with the side wall. The first edge guide defines a groove. A first edge of the side wall is complementary in shape to the groove and is received in the groove when the sections are mated. A second angled edge is formed on the free end of each side wall and is received in a complementary-shaped second edge guide extending along the side edge of the adjacent base wall.

The container can include a plurality of stacking devices formed on both the inner and outer surfaces of the base walls to permit several containers to be stacked, interlocked, and secured from relative lateral motion both when the containers are disassembled and broken down for flat storage as well as when the containers are assembled as complete containers.

The sections are formed as flat sections using a molded plastic material. Living hinges are formed along the parallel lines. The container is blow-molded and is reusable many times. The sections are formed of substantially a single material so that the storage container is recyclable into additional containers.

In an alternative embodiment, each section is formed in two halves to form a four section container.

BRIEF DESCRIPTION OF THE DRAWINGS

FIG. 13 is a perspective view of a container according to another embodiment of the present invention.

FIG. 14 is a perspective view of a section of a modified version of the container of FIG. 13.

DETAILED DESCRIPTION OF PREFERRED EMBODIMENT

Figure 1:
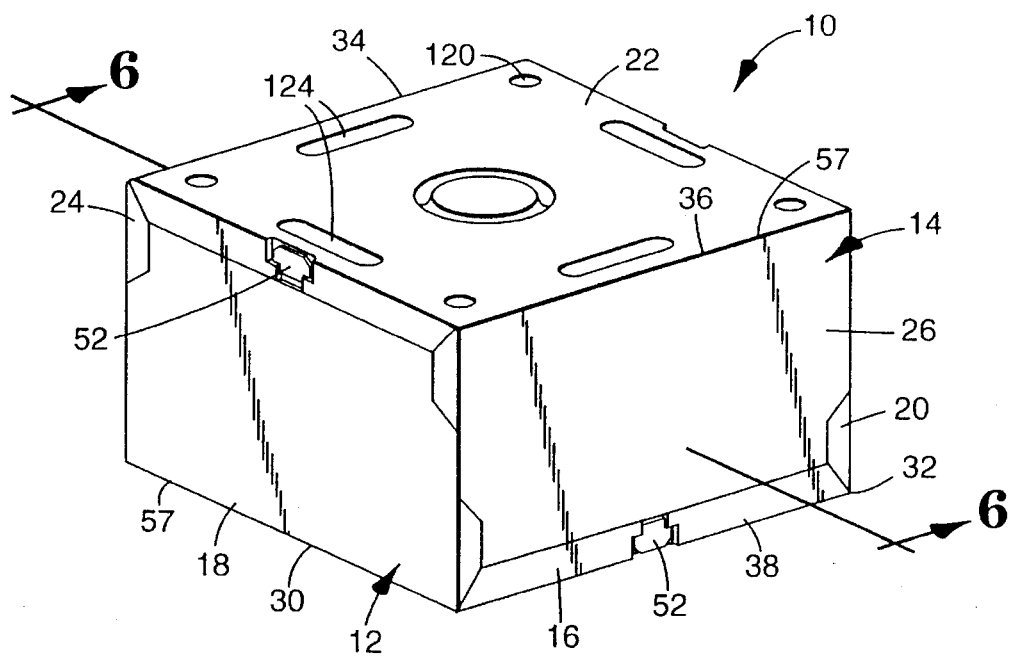
FIG. 1 is a perspective view of an assembled container according to one embodiment of the present invention.

FIGS. 1–6 and 10 illustrate the container according to one embodiment of the present invention. The container 10 is used for pancakes 88 of recording tape, each of which includes a quantity of tape wound around a flangeless hub or core which extends approximately 0.25 cm (0.1 in) on each side of the tape. The container 10 includes a base, a mandrel extending from the base on which a plurality of pancakes can be placed, and a cover which combines with the base to completely enclose the pancakes.

A thin spacer can be disposed between adjacent pancakes on each mandrel to prevent the adjacent cores from contacting each other and to prevent "hub dusting" which creates debris. End pads or bushings can be placed on the walls of the base to space the pancakes from the wall, maintain constant axial pressure on the pancakes, and prevent damage to the adjacent pancake due to contact with the wall if the wall bows and contacts the pancake nonuniformly. However, it is preferred that no pads and no spacers be used. The peripheral edges of the pancakes are completely exposed to allow them to be grasped symmetrically to reduce the effort needed to remove the pancakes from the mandrel. This reduces the risk of damage to the pancakes and injury to workers.

As best shown in FIGS. 2, 3, 4, and 5, the parallelepipedal storage container 10 is formed of substantially identical first and second sections 12, 14. Each section 12, 14 is rectangular. The first section 12 is foldable to separate the section into a central base wall 16 and two side walls 18, 20. The second section 14 is foldable to separate the section into a central base wall 22 and two side walls 24, 26. The adjacent base and side walls 16, 18, 20 and 22, 24, 26 can be oriented at right angles to each other to form a U. The storage container 10 is formed by folding the first section 12 into a U, folding a second section 14 into a U, turning the second section 14 upside down and rotating it 90° with respect to the first section 12, and mating the two sections 12, 14 so that the side edges 28 of the side walls 18, 20 of the U on the first section 12 are disposed adjacent the side edges 28 of the side walls 24, 26 of the U on the second section 14 to form edges of the storage container 10. The two sections 12, 14 are secured together to form the container 10.

Each section 12, 14 is foldable along two parallel lines 30, 32 and 34, 36 which separate the section into the central base wall 16, 22 and the two side walls 18, 20, 24, 26, respectively. The two sections 12, 14 are biased along the parallel fold lines 30, 32, 34, 36 to allow the sections to rest either flat or bent at right angles. Alternatively, separate locking latches or similar devices can be used to hold the side walls 18, 20, 24, 26 perpendicular to the respective base walls 16, 22. The two sections 12, 14 are secured together using a tongue and groove type connection, best shown in FIGS. 5 and 10, to mate the sections 12, 14 along respective edges.

A tongue and a groove type connection is mounted on each side wall edge 28 to mate with a respective connection on the adjacent side wall edge 28 when the sections 12, 14 are mated. Each edge 28 of each side wall 16, 18, 24, 26 includes an edge guide 38 extending along a part of the length of the edge 28 adjacent the base wall 16, 22. The edge guide 38 extends at a substantially right angle with the respective side wall 18, 20, 24, 26 and extends toward the inside of the container 10. The portion of the edge 28 adjacent the free end 40 of each side wall 18, 20, 24, 26 has a cutout portion 42 with an angled edge 46 that is complementary to that formed by the edge guide 38 and the side wall 28. The cutout portion 42 receives a respective edge guide 38 on a respective side wall of the other section when the sections 12, 14 are mated while the edge guide 38 of one side wall on one of the sections receives a corresponding length of the angled edge 46 of the edge 28 adjacent the free end 40 of the adjacent side wall on the other section.

Additionally, the free end 40 of each side wall 18, 20, 24, 26 has an angled edge 46 extending for most of its entire length. This angled edge 46 is received in a complementary-shaped groove formed by an edge guide 38 extending along a part of the length of the side edge 48 of the adjacent base wall 16, 22. The edge guide 38 extends at a substantially right angle with the respective base wall 16, 22 and extends toward the inside of the container 10.

Figure 10:
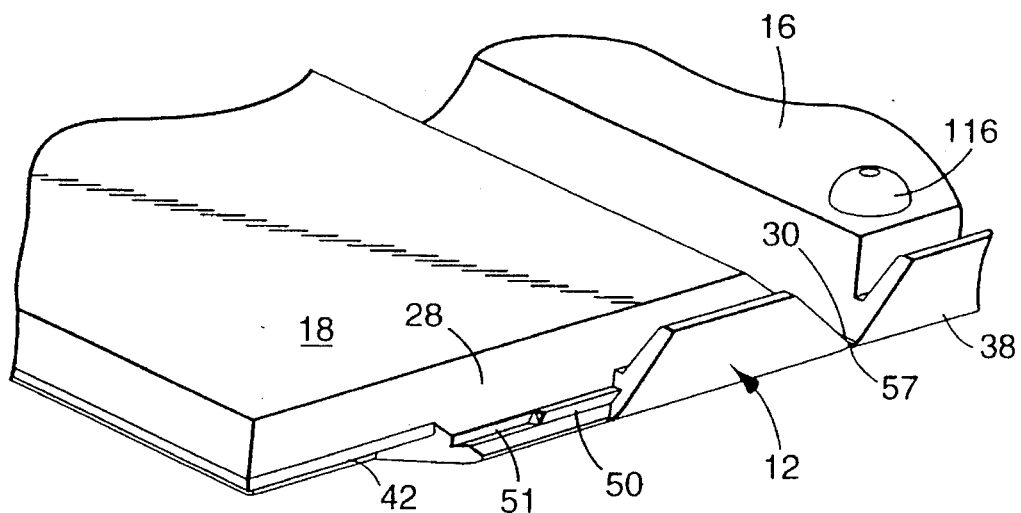
FIG. 10 is an enlarged perspective view of the system for connecting the sections of the container.

The edge guides 38 and the angled edges 46 can each extend for approximately one third of the length of the side wall edges 28 as shown in the figures. The central third of the length of the side wall edges 28 can simply abut or can be formed complementarily to improve the dust seal provided by the container 10, as shown in FIG. 10. In FIG. 10, the central third of the length of the side wall edges 28 is divided in half with one half of the edge having a triangular rib 50 and the other half having a complementary triangular slot 51. Corresponding ribs 50 mate with corresponding slots 51 on respective side wall edges when the sections 12, 14 are mated to form the container 10. Alternatively, the edge guides 38 and the angled edges 46 can extend for substantially half of the length of the side wall edges 28.

The container 10 seals out dust and other contaminants. Detents could be molded into the section walls to provide a dimple and cavity lock in addition to the tongue and groove connection. Additionally, latches 52 can be integrally molded as one piece with the container sections and used to further secure the sections together. These latches 52 can be centrally located at the free end 40 of each side wall 18, 20, 24, 26 and at the central portion of the base wall edges, as shown in the figures. Additional latches can be formed in the central area between the edge guide 38 and the angled edge 46 on the side edges 28.

Figure 2:
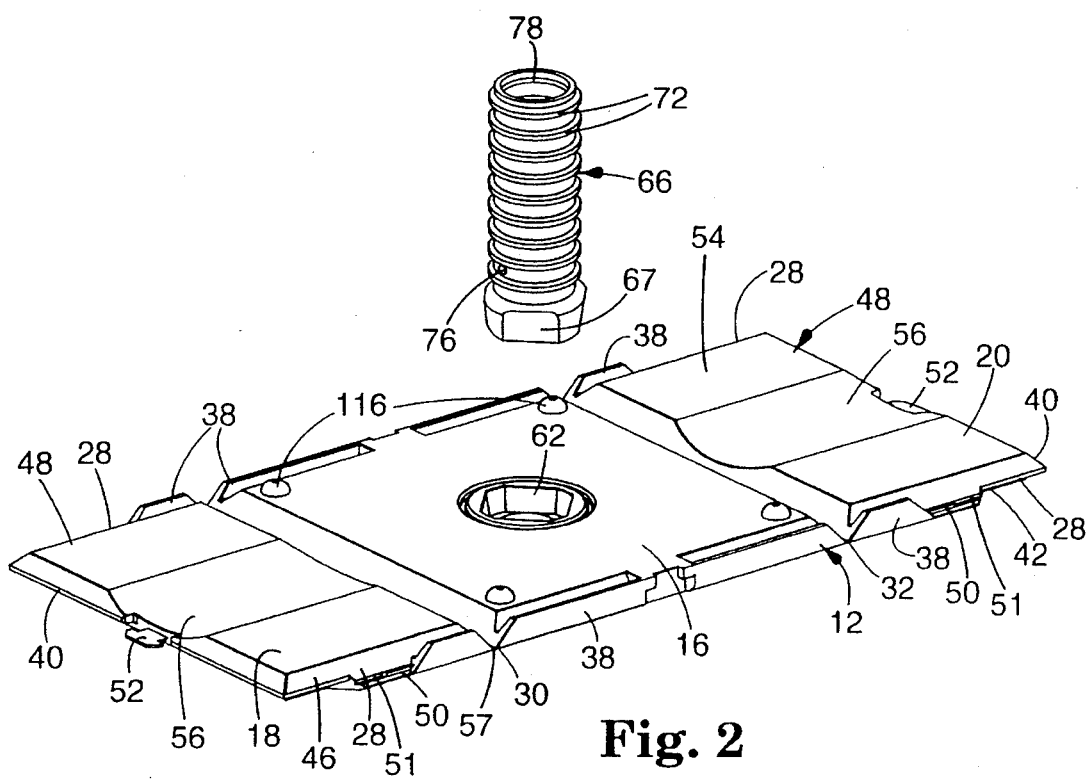
FIG. 2 is a perspective view of the first section of the container of FIG. 1 with the first section flat and showing the baffled core support.
Figure 4:
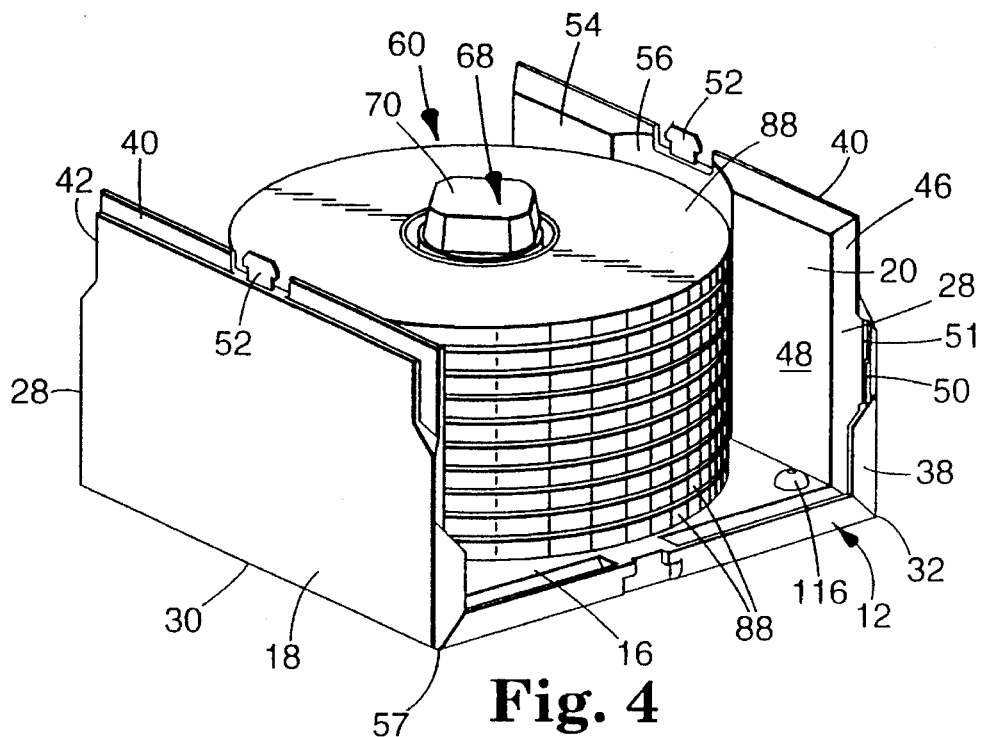
FIG. 4 is a perspective view of the first section of FIG. 3 with the interior rod in place within the baffled core support and the sides of the first section bent at 90° angles.
Figure 5:
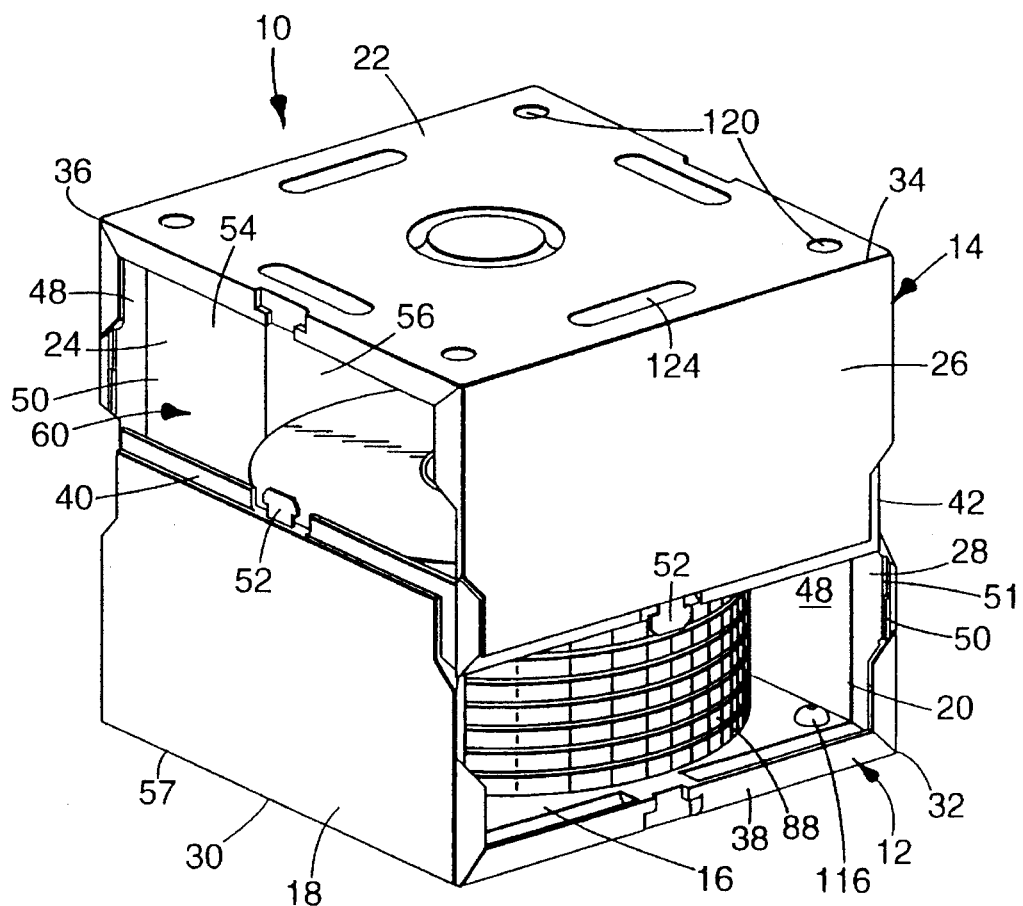
FIG. 5 is a perspective view of the container of FIG. 1 with the second section being placed on the first section.

As shown in FIG. 2, the sections 12, 14 are formed as flat sections using a molded plastic material. The inner surfaces 54 of the side walls 18, 20, 24, 26 can include a curved portion 56 shaped to approximate the shape of the pancakes to provide a close fit between the stored pancakes and the walls of the container 10. Living hinges 57 are formed along the fold lines 30, 32, 34, 36. The living hinges 57 are arced or curved hinges which are biased in either a flat 180° (FIGS. 2 and 3) orientation or in a 90° orientation (FIGS. 4 and 5).

Figure 11:
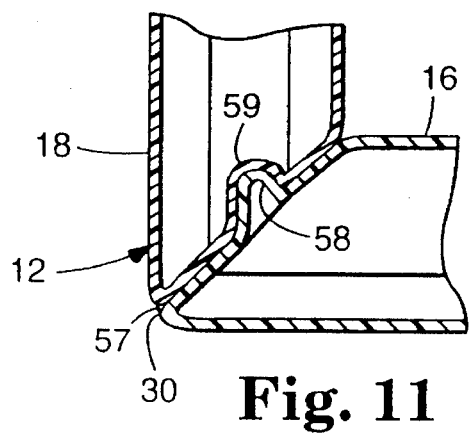
FIG. 11 is a partial cross-sectional view of a system of maintaining a section in position.

Alternatively, the side walls 18, 20, 24, 26 can be retained in the 90° orientation with the respective base walls 16, 22 using a tab 58 and slot 59 located adjacent the fold lines 30, 32, 34, 36 of the sections 12, 14 as shown in FIG. 11. The tab 58 is located on the beveled side of one of the side wall and the base wall and the slot 59 is located on the beveled side of the other of the side wall and the base wall. As shown, the tab 58 is on the base wall 16, 22 and the slot is on the side walls, 18, 20, 22, 24. The tab 58 and slot 59 can extend for substantially the entire length of the beveled side of the side and base walls or can be discrete segments. Alternatively, a similar locking arrangement can be located on the base and side walls adjacent the beveled edges and on the inner surfaces 54, 55 of the side and base walls.

The container 10 is blow-molded flat using simple tooling at low cost. Blow-molding uses a double wall construction and is reusable many times. Alternatively, the sections 12, 14 can be made by injection molding, twin-sheet thermoforming, and other methods. The sections can be made from high density polyethylene to create strong, lightweight, hollow shells. The double wall construction causes the box to collapse from the outside when subject to forces, rather than collapsing from the inside due to shifting of the core support as is likely with a single wall construction. This better protects the contents. Due to the configuration of the edge guides 38, the container 10 can not explode on impact. The only way to break open the container is to implode it. Tests have shown the container to withstand forces of 7560N (1700 lbs). Moreover, the contents of the container will prevent implosion.

The sections 12, 14 are formed of substantially a single material so that the storage container 10 is easily recyclable into new containers. Alternatively, the sections can be lined with an insulating foam such as polyurethane to prevent wide temperature variations within the container 10 and prevent core drop resulting from temperature changes.

Each section 12, 14 of the storage container 10 includes a system 60 for securing a plurality of disk-shaped articles having a central opening, such as tape pancakes. A receptacle 62 is formed in the base wall 16, 22 of each section 12, 14, and a support 64 on which the pancakes can be mounted has its ends receivable within a respective receptacle 62. The receptacle 62 can have planar walls as shown to enhance the engagement of the support 64 within the receptacle. The support 64 can be made of material having a suitable strength-to-weight ratio such as any strong, lightweight material such as high density polyethylene or rigid polyvinyl chloride without high lubricity to enable frictional locking of the pancakes.

Figure 6:
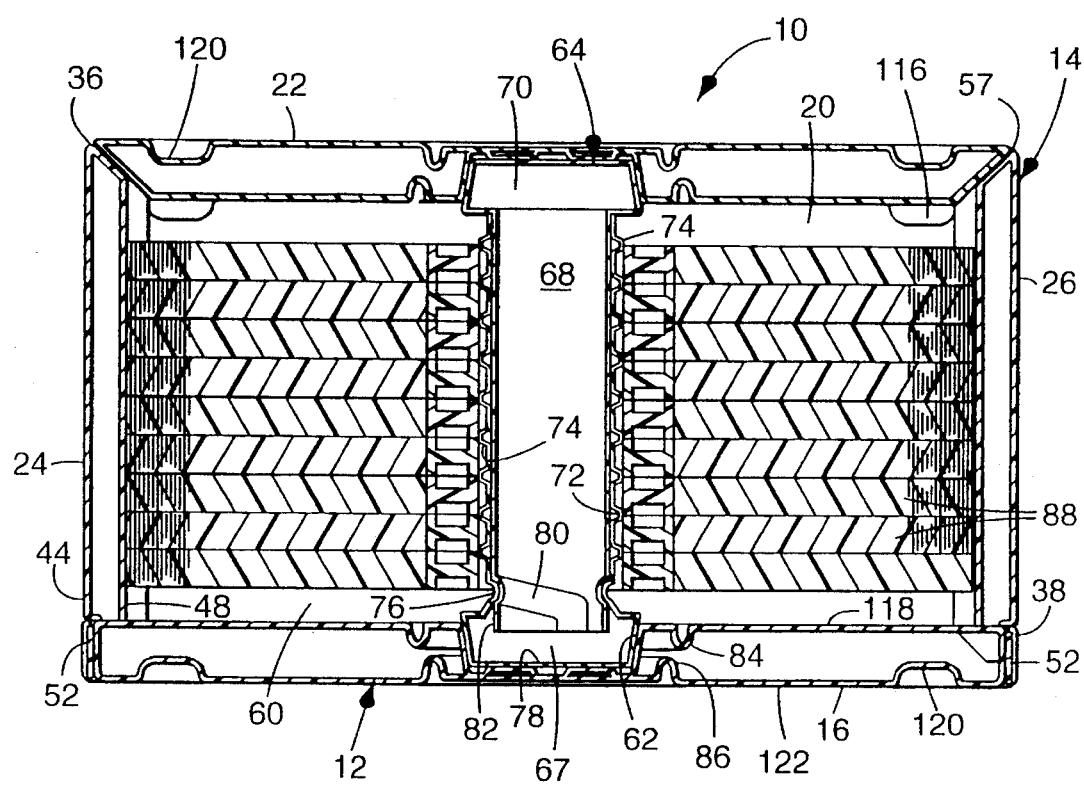
FIG. 6 is a cross-sectional view of the container taken through line 6—6 of FIG. 1.

The support 64 is a spindle or mandrel which is isolated vibrationally from the container sections. The support can move independently of the remainder of the container 10 to absorb shocks and protect the stored pancakes. The support 64, and therefore the pancakes, is isolated by from vibration in part by the double wall construction which enables independent movement of the inner wall from the outer wall as well as independent movement of the portion of one wall on one side of the support 64 from the portion of the wall on another side of the support. As shown in FIG. 6, the inner surface 118 of the base wall 22 and the outer surface 122 of the base wall 22 are formed with U-shaped grooves 84, 86. The grooves 84, 86 approximately face each other and permit the inner surface 118 to move independently from the outer surface 122. Thus, the grooves 84, 86 can move back and forth to absorb shock and protect tape pancakes 88 mounted on the support system 60.

Figure 3:
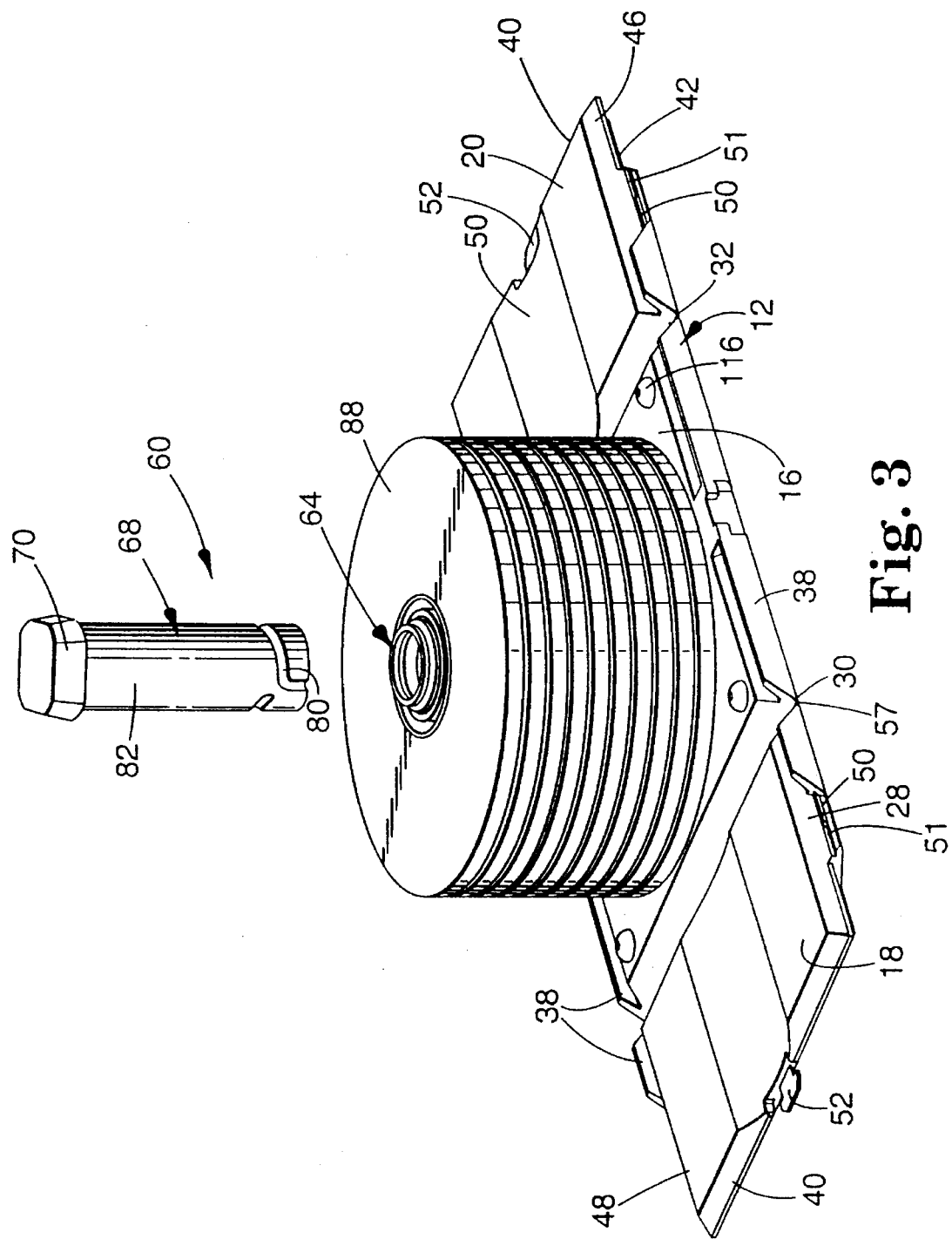
FIG. 3 is a perspective view of the first section of FIG. 2 showing tape pancakes loaded on the baffled core support and also showing the interior rod.

Referring to FIGS. 2, 3, and 6, the support 64 is formed of two primary components, a baffled core support 66 with a head 67 and an interior rod 68 with a head 70. The heads 67, 70 fit within respective receptacles 62 in the first and second sections 12, 14. The noncircular shape of the heads 67, 70 fit within the receptacles 62 and prevent rotation of the support 64 after the container 10 is assembled. The interior rod 68 fits within the core support 66. These two components can be formed by blow molding a single spindle and cutting the spindle to form the core support 66 and interior rod 68. The baffles 72 can be ribs with some of the baffles extending completely around the core support 66 and others broken. The baffle 72 dimensions are selected to permit two pancakes to share a baffle peak 74 when the pancakes are mounted on the core support 66. Thus, each baffle peak 74 will support two adjacent pancake halves.

A nub 76 on the inside surface 78 of the core support 66 engages a spiral groove 80 on the outside surface 82 of the interior rod 68 to provide a threaded engagement between the interior rod 68 and the core support 66. The interior rod 68 can be hand turned and tightened without tools. Other modifications of a threaded engagement between the core support 24 and the interior rod 26 also could be used.

Rotation of the interior rod 68 within the core support 66 after the nub 76 engages the groove 80, moves the interior rod 68 toward the pancake stack. Further rotation after the head 70 of the interior rod 68 contacts the end of the core support 66 provides an axial compression load onto the core support 66 and therefore onto the pancake cores to hold together the pancakes. This axial compression expands the baffles 72. As the baffles 72 expand they contact and tighten against the inside of the tape pancake cores and provide a radial force to secure the pancakes in place.

As shown in FIG. 6, the interior rod head 70 compresses the pancakes on the support 64 by applying a load on substantially only the pancake cores. By eliminating pressure on the tape itself, there is no pressure on the tape to force the tape off of the core and cause core drop. The load can be applied to substantially only the outer race of the cores to avoid tipping the pancake on the mandrel due to the lack of contact surface area caused by the clearance between the pancake core and the mandrel. This can be accomplished by forming the inner race of the core of a smaller axial length than the outer race. Alternatively, this can be accomplished by forming the portion of the interior rod head that is disposed adjacent the inner race of the core of a smaller axial length than the radially outer portions of the head that is disposed adjacent and against the outer race of the core.

Figure 7:
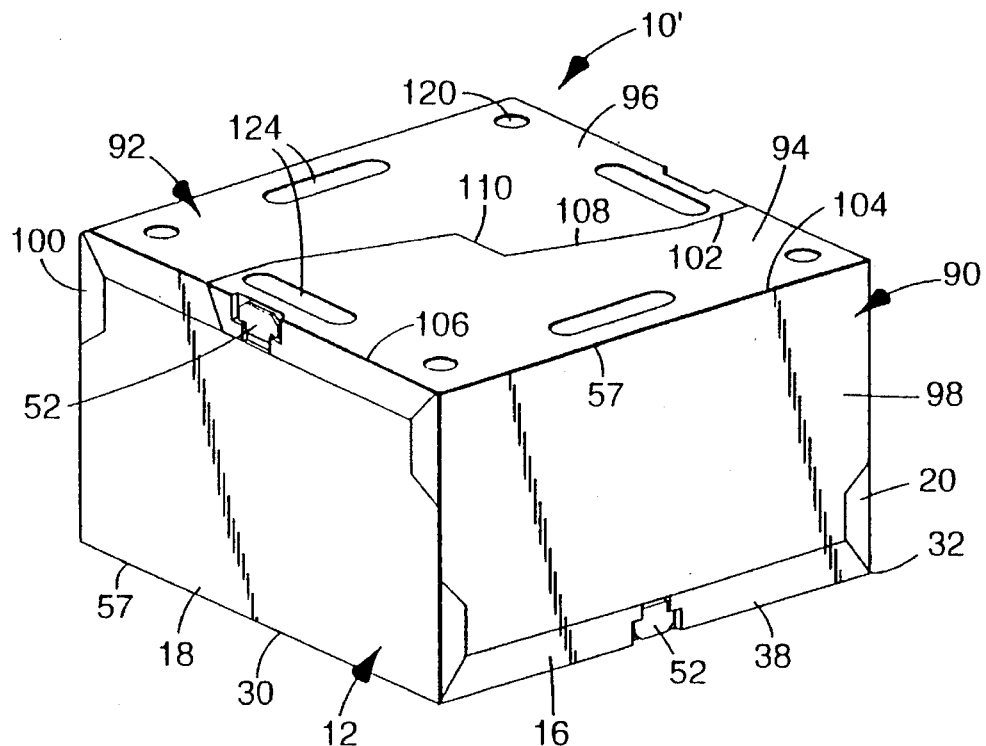
FIG. 7 is a perspective view of the container according to another embodiment of the present invention.
Figure 8:
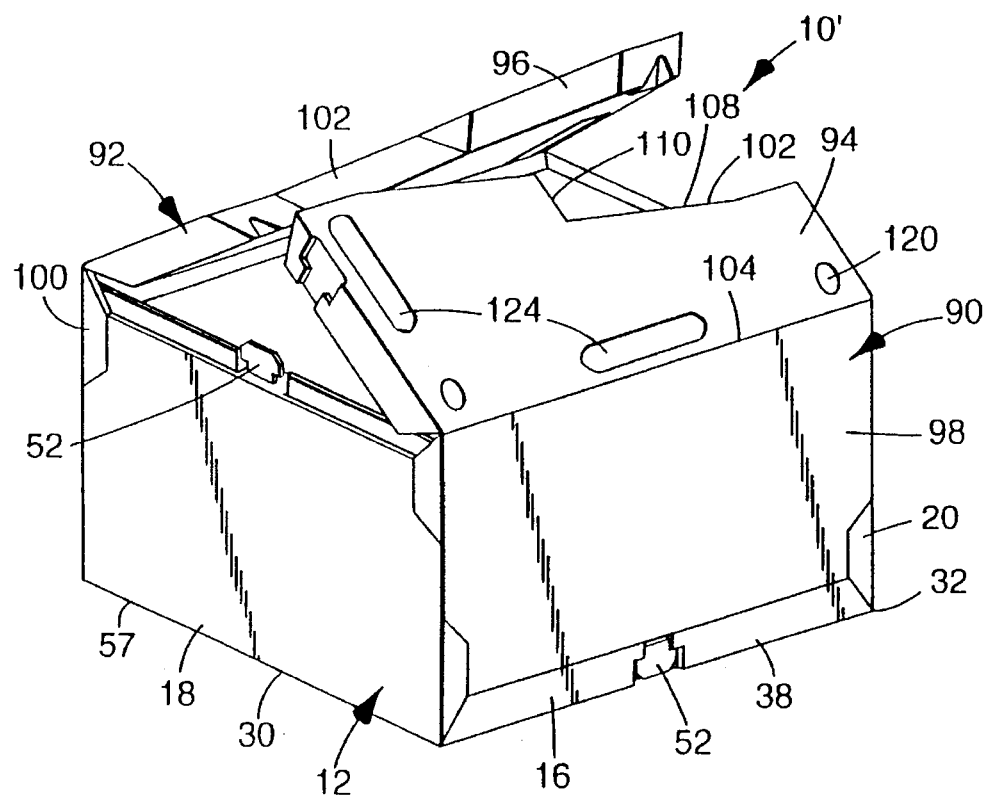
FIG. 8 is a perspective view of the container of FIG. 7 in an open configuration.
Figure 9:
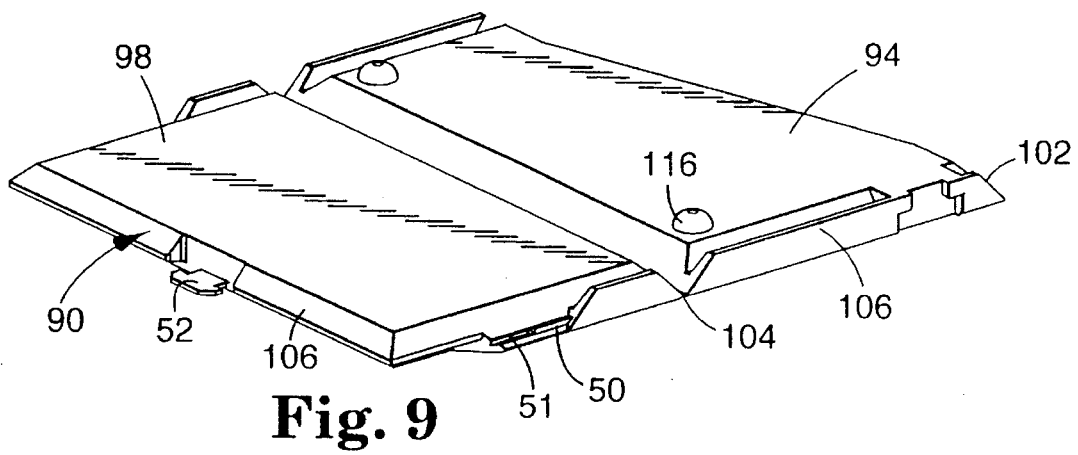
FIG. 9 is a perspective view of the second section of the container of FIG. 7.

In an alternative embodiment, shown in FIGS. 7–9, the assembled storage container 10' is configured to have an easily openable lid. In this embodiment, the storage container 10' includes three sections. A first section 12 is rectangular and is foldable to separate the section into a central base wall 16 and two side walls 18, 20. The adjacent base and side walls 16, 18, 20 can be oriented at right angles to each other to form a U. This section is identical to the first section 12 in the two section embodiment.

Substantially identical second and third sections 90, 92 are foldable to separate each second and third section into half of a central base wall 94, 96 and one side wall 98, 100. The adjacent base wall half 94, 96 and the respective side wall 98, 100 can be oriented at right angles to each other. Each half base wall 94, 96 has a free edge 102, an opposing edge 104 adjacent to the side wall, and two free side edges 106. The second and third sections 90, 92 can be positioned with the half base walls 94, 96 coplanar and with the respective free edges 102 of the half base walls abutting each other to form a U. This storage container 10' is formed by folding the first section 12 into a U, folding the second and third sections 90, 92 into an L, and mating the first and second and the first and third sections so that the side edges 28 of the side walls 98, 100 of the second and third sections 90, 92 are disposed adjacent the side edges 28 of the side walls 18, 20 of the U to form edges of the storage container 10'.

After the container 10' is formed, when the half base walls 94, 96 of the second and third sections 90, 92 are coplanar, the container 10' is closed. When the half base walls 94, 96 of the second and third sections 90, 92 are not coplanar the container 10' is open. The half base walls 94, 96 of the second and third sections 90, 92 form the cover of the container 10'. This embodiment of the container 10', like the container 10, can be used with pancakes, with or without a support, or as a container for other objects.

All three sections of this embodiment can be rectangular. Alternatively, as shown in the figures, the two free side edges 106 of each half base wall 94, 96 can have unequal lengths. The free edge 102 of each half base wall 94, 96 includes two first portions 108 generally parallel to the opposing edge 104 and a second portion 110 angled from each first portion 108 and connecting the two first portions.

Figure 17:
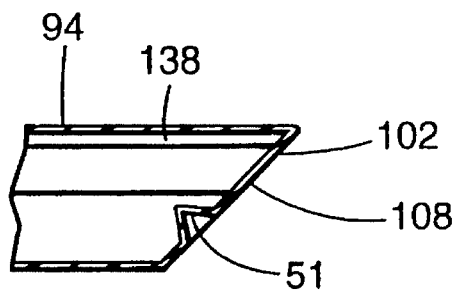
FIG. 17 is a cross-sectional view of the container taken along line 17—17 of FIG. 14.

The free edge 102 of each first portion 108 can be formed with a complementary bevel or lip 126. Thus, when the half base walls 94, 96 of the second and third sections 90, 92 are coplanar and adjacent to close the container 10' the opposing lips 126 mate with each other to improve the dust seal provided by the container 10'. In a modification shown in FIGS. 14 and 17, each lip 126 is divided in half with one half of the lip 126 having a triangular rib 50 and the other half having a complementary triangular slot 51. Corresponding ribs 50 mate with corresponding slots 52 on respective first portions 108 of the free edge 102 when the sections 90, 92 are mated to form the container 10'. Alternatively, the rib and slot combination can extend for different portions of the first portion 108.

Figure 12A:
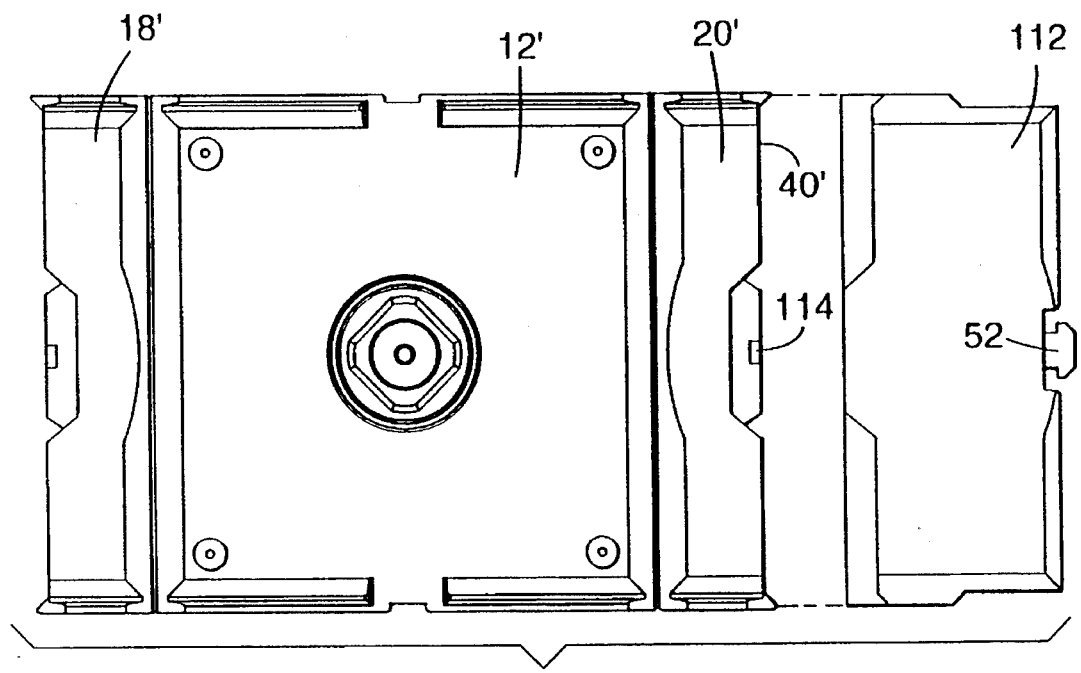
FIGS. 12A, 12B, and 12C are top views of the sections of a container according to another embodiment of the present invention.
Figure 12B:
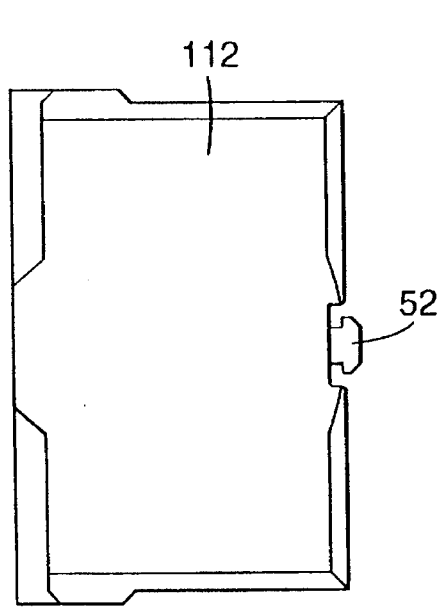
Figure 12C:
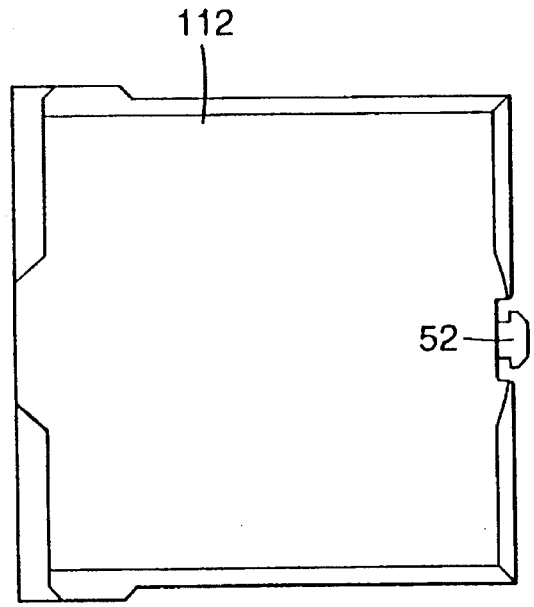
Figure 15:
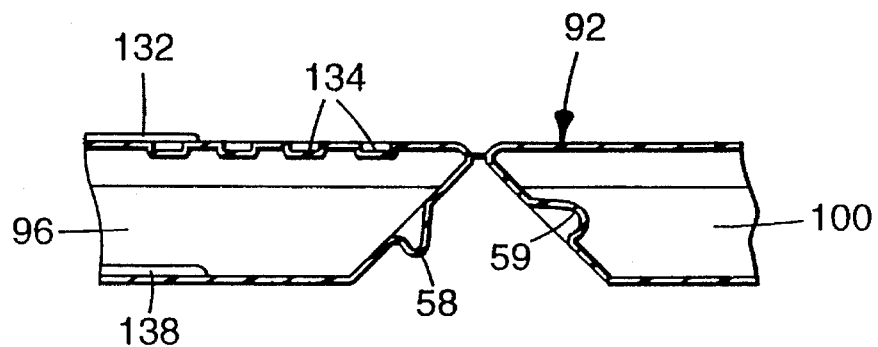
FIG. 15 is a cross-sectional view of the container taken along line 15—15 of FIG. 13.
Figure 16:
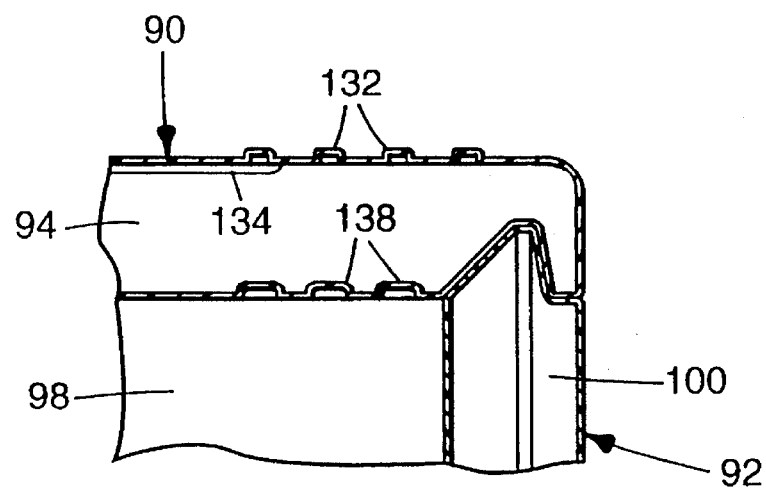
FIG. 16 is a cross-sectional view of the container taken along line 16—16 of FIG. 13.

In another embodiment shown in FIG. 12, a container can be formed with first and second sections such as section 12' in which the side walls 18', 20' are relatively short. Additional side panels 112 interlock with the free end 40' of the side walls to form the container side walls. Several side panels 112 having different lengths, as shown in FIGS. 12B and 12C, can be used to form a container having different volumes. The side panels 112 interlock with the free end 40' of the side walls using interlocking detents 114. As shown, the detents 114 are located in the central portion of the free ends 40' although the detents 114 can be located on each side of the free ends 40'. The side panels 112 are detached from the side walls 18', 20' by bending the connection sufficiently to unlatch the detents. Alternatively, containers of any size can be formed by simply varying the size of the first and second sections. For example, containers having walls the size of a pallet can be used.

In another alternative embodiment, shown in FIGS. 13–17, the assembled storage container 10" includes four sections, each of which is the same as the second and third sections 90, 92 in the embodiment of FIGS. 7–9. These sections will be referred to as sections 90. Each section 90 is foldable to separate each section into half of a central base wall 94 and one side wall 98. The adjacent base wall half 94 and the respective side wall 98 can be oriented at right angles to each other. Each half base wall 94 has a free edge 102, an opposing edge 104 adjacent to the side wall, and two free side edges 106. Two sections 90 can be positioned with the half base walls 94 coplanar and with the respective free edges 102 of the half base walls abutting each other. This storage container 10" is formed by folding each section 90 into an L, and mating the sections so that the side edges 28 of the side walls 98 of the sections 90 are disposed adjacent the side edges 28 of the side walls of adjacent sections to form edges of the storage container 10".

After the container 10" is formed, when the half base walls 94 of the two pairs of adjacent sections 90 are coplanar, the container 10" is closed. When the half base walls 94 of two adjacent sections 90 are not coplanar the container 10" is open. The half base walls 94 of two adjacent sections 90 form the cover of the container 10". This embodiment of the container 10", like the container 10, can be used with pancakes, with or without a support, or as a container for other objects.

Like the sections of the container 10', all sections of this embodiment can be rectangular, or, the two free side edges 106 of each half base wall 94 can have unequal lengths, can have lips, and can have complementary ribs and slots as described with respect to FIGS. 7–9.

Additionally, the shape and proportions of the container 10" can be varied by using two identical sections 90 of one size and two other identical sections 90 of another size. In the illustrated embodiments, the width of the side walls 98 in a direction parallel to the opposing edge 104 are identical. If this dimension is changed for two of the four sections (on both side walls 98, and on the base wall half 94) and the perpendicular direction of the base wall half of the other two sections is correspondingly changed, the proportions of the container are changed. Thus, the four section container 10" can have many different shapes and proportions, in addition to many different sizes.

All embodiments of this container 10, 10', 10" can have several buttons 116 formed on the inner surface 118 of the base walls 16, 22. These buttons 116 are receivable within complementarily-shaped indents 120 in the outer surface 122 of adjacent base walls 16, 22 when sections 12, 14 are stacked for storage or shipping. This feature can be used when the containers are broken down in the flat configuration. Similar stacking buttons 116 can be formed on the outer surface 122 of the base walls 16, 22 to permit the containers 10 to be stacked as boxes. Alternatively, the buttons 116 can be formed on the outer surface 122 of the base wall with the indents 120 formed on the inner wall 118. Additionally, handles 124 can be molded into the base walls 16, 22 along each edge of the base walls to facilitate carrying the container 10.

One improvement on the stacking buttons is to place two stacking buttons 116 at opposite corners of the inner surface 116 and two indents 120 at the other two corners of the inner surface. Two indents 120 are placed on the outer surface 122 opposite the inner surface stacking buttons. Two stacking buttons 116 are placed on the outer surface 122 opposite the inner surface indents 120. This configuration permits one set of buttons and indents to be used to enable stacking both when the containers are broken down as well as when the containers are stacked as boxes. One drawback of this configuration is that the containers do not rest flat on a smooth surface and can tend to tip due to the placement of stacking buttons 116 at only two opposing corners.

An improvement on the stacking buttons enables several containers to be stacked, interlocked, and secured from relative lateral motion both when the containers are disassembled and broken down for flat storage as well as when the containers are assembled as complete containers. This improvement also prevents tipping and includes forming stacking devices 130 which are not located on the diagonal of the base walls of the container. FIGS. 13–17 show these features as a series of four mating outer ribs 132, outer slots 134, inner ribs 136, and inner slots 138, although more or fewer ribs and slots and other complementary-shaped configurations can be used.

This stacking system requires the ribs 132 to be located adjacent one corner of the base wall off of the diagonal on the outer surface 122 of the wall. The slots 134 are located adjacent the same corner on the other side of the diagonal on the outer surface 122. Particularly to minimize the total volume of stacked disassembled sections if the perimeter of the entire sections is not square, slots 138 are located on the inner surface 118 of the wall directly beneath the ribs 132 and ribs 136 are located on the inner surface 118 directly beneath the slots 134. For example, as shown in the cross sections of FIGS. 15 and 16, where the ribs 132 are located on the outer surface 122 of the wall, slots 138 are located directly opposite the ribs 132 on the inner surface 118 of the wall. Ribs 132, 136 and slots 134, 138 can be located around only one corner, two adjacent corners, to opposite corners, three corners, or all four corners. The ribs 132, 136 and slots 134, 138 can extend along the entire side of the wall or for a short distance around the diagonal. If the ribs 132, 136 and slots 134, 138 extend for only a short distance, and are located around more than one corner, the stacking device 130 along one side for two corners can both be ribs, both be slots, or can be one of each. This is true regardless of whether the stacking device 130 is located around opposite or adjacent corners. It is also envisioned that slots 138 can be located along only two opposite sides of the inner surface 118 of the wall while ribs and slots are located along all four sides of the outer surface 122 of the wall as shown in FIG. 13.

During stacking of unassembled, flat sections such as sections 12 or 90, the sections are simply stacked on top of each other with the outer surface 122 of one section disposed against the inner surface 118 of an adjacent section and with the side walls 18, 98 corresponding to each other and the base walls 16 or base wall halves 94 corresponding to each other. During stacking of assembled containers where the ribs 132, 136 and slots 134, 138 extend along all four sides, a container must be rotated 90° before stacking on another container.

Rib and slot combinations can be grouped around one corner, all corners, or any number of corners. The ribs can but need not extend for the entire width of the base wall. The ribs and slots can be formed, machined, molded, or connected in any other way to the sections.

When used for shipping pancakes, the container is molded flat as sections and is assembled into a container around a stack of pancakes by a distributor. The container is shipped to a customer who opens the container, removes the pancakes, and folds the container sections flat. The flat sections are then shipped back to the distributor for refilling and reuse. Containers are expected to last for approximately 15 cycles when made of high density polyethylene. The containers can be shipped with the support 64 horizontal and the base walls 16, 22 vertical and the receptacle 62 can be bubbled outwardly to prevent stacking with the support 64 vertical. Shipping with the base walls 16, 22 horizontal is also satisfactory.

This container meets many customer, social, and environmental needs. The cost of the container is less than currently used corrugated cardboard containers and the container requires less labor to unpack. The container requires less storage space than current containers both when the container is set up and when it is unfolded. The container fits into current material handling systems and can be marked easily to identify the contents. Less waste is generated during the manufacture and use of this container and the container is stackable on pallets. Moreover, the container does not damage pancakes and the stored pancakes are free from external debris from the container as the container does not generate debris. The container is safe and easy to open. The container is environmentally sound in that it is refillable, reusable, and recyclable. An appropriate material selection would permit regrinding and simple recycling of damaged or worn containers.

The system for applying a compression load on pancakes stored on a mandrel can be used in other systems in which one or more objects having a through opening are stored on a mandrel or spindle and the objects are held in place using axial and/or radial compression. Neither the objects nor the mandrel need be cylindrical.

Various changes and modifications may be made in the invention without departing from the scope or spirit of the invention. Although the walls 16, 22, 94, 96 of the sections 12, 14, 90, 92 are described as base walls, any of the walls could serve as the base, top, or side walls. The description of the walls as base, top, or side corresponds to the illustrated embodiments and these descriptions in the claims is not intended to limit the orientation at which the containers can be used. Additionally, sections can be formed with portions of four side walls adjacent the base wall of a section. Preferably, two opposing side walls are longer than the other two opposing side walls.

We claim:

1. A stacking device for use on containers that can be disassembled into flat sections, wherein each container includes a first wall and a second wall and wherein the first wall includes an inner surface, an outer surface, first and second corners, and edges, wherein the stacking device permits fully assembled containers to be interlocked and secured from lateral motion and permits disassembled container sections to be interlocked and secured from lateral motion, wherein the stacking device comprises:

a first positive locking member located on the outer surface of the first wall adjacent a first corner of and on one side of a line dividing the angle of the corner of the first wall;

a first negative locking member located on the outer surface of the first wall adjacent the first corner of and on the other side of the line dividing the angle of the corner of the first wall; and a second negative locking member located on the inner surface of the first wall, adjacent the first corner of and on the one side of the diagonal of the first wall, and directly opposite the first positive locking member.

2. The stacking device of claim 1 further comprising a second positive locking member located on the inner surface of the first wall, adjacent the first corner of and on the other side of the diagonal of the first wall, and directly opposite the first negative locking member.

3. The stacking device of claim 1 wherein each positive locking member comprises a series of ribs and each negative locking member comprises a series of complementary slots.

4. The stacking device of claim 1 wherein the locking members extend for most of the length of their respective adjacent edges.

5. The stacking device of claim 1 wherein the first wall is square and includes third and fourth corners and the stacking device further comprises first and second positive and negative locking members located at opposite corners.

6. The stacking device of claim 1 wherein the first wall is square and includes third and fourth corners wherein first and second positive and negative locking members are located at adjacent corners.

7. A stacking device for use on containers that can be disassembled into flat sections, wherein each container includes a first wall and a second wall and wherein the first wall includes an inner surface, an outer surface, and first and second sides, wherein the stacking device permits fully assembled containers to be interlocked and secured from lateral motion and permits disassembled container sections to be interlocked and secured from lateral motion, wherein the stacking device comprises:

a first positive locking member located on the outer surface of the first wall adjacent the first side of the first wall;

a first negative locking member located on the outer surface of the first wall adjacent the first side of the first wall; and a second negative locking member located on the inner surface of the first wall, adjacent the first side of the first wall, and directly opposite the first positive locking member.

8. The stacking device of claim 7 further comprising a second positive locking member located on the inner surface of the first wall, adjacent the first side of the first wall, and directly opposite the first negative locking member.

9. A container that can be disassembled into flat sections, wherein each container includes a first wall and a second wall and wherein the first wall includes an inner surface, an outer surface, first and second corners, and edges, and a stacking device which permits fully assembled containers to be interlocked and secured from lateral motion and permits disassembled container sections to be interlocked and secured from lateral motion, wherein the stacking device comprises:

a first positive locking member located on the outer surface of the first wall adjacent a first corner of and on one side of a line dividing the angle of the corner of the first wall;

a first negative locking member located on the outer surface of the first wall adjacent the first corner of and on the other side of the line dividing the angle of the corner of the first wall; and a second negative locking member located on the inner surface of the first wall, adjacent the first corner of and on the one side of the diagonal of the first wall, and directly opposite the first positive locking member.

* * * * *